US010955016B2

(12) United States Patent
Lim et al.

(10) Patent No.: US 10,955,016 B2
(45) Date of Patent: Mar. 23, 2021

(54) DISC BRAKE

(71) Applicant: HITACHI AUTOMOTIVE SYSTEMS, LTD., Ibaraki (JP)

(72) Inventors: Khai Piau Lim, Minami-Alps (JP); Shiro Nagashima, Kai (JP); Shinji Suzuki, Minami-Alps (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 169 days.

(21) Appl. No.: 15/998,947

(22) PCT Filed: Mar. 15, 2017

(86) PCT No.: PCT/JP2017/010397
§ 371 (c)(1),
(2) Date: Aug. 17, 2018

(87) PCT Pub. No.: WO2018/003197
PCT Pub. Date: Jan. 4, 2018

(65) Prior Publication Data
US 2020/0096065 A1 Mar. 26, 2020

(30) Foreign Application Priority Data

Jun. 28, 2016 (JP) .............................. JP2016-127834

(51) Int. Cl.
*F16D 65/097* (2006.01)
(52) U.S. Cl.
CPC .................................. *F16D 65/097* (2013.01)
(58) Field of Classification Search
CPC ............... F16D 65/097; F16D 65/0972; F16D 65/0973; F16D 65/0974
(Continued)

(56) References Cited

U.S. PATENT DOCUMENTS 5,699,882 A 12/1997 Ikegami et al.
7,299,903 B2 * 11/2007 Rockwell ............ F16D 65/0972
188/73.36
(Continued)

FOREIGN PATENT DOCUMENTS

JP 56-131038 A 10/1981
JP 56-131038 U 10/1981
(Continued)

OTHER PUBLICATIONS

Chinese Office Action received in corresponding Chinese Application No. 201780011844.8 dated Jun. 19, 2019.
(Continued)

*Primary Examiner* — Thomas W Irvin
(74) *Attorney, Agent, or Firm* — Mattingly & Malur, PC

(57) ABSTRACT

A pad spring has a guide part which is attached to come into contact with an inner side surface and a bottom surface on an outer side in a disc radial direction of a pad guide, and guides the friction pad in a disc axial direction, and an extension part which extends from the guide part in a direction away from the friction pad and comes into contact with a side surface of a torque receiving part of the attachment member by a projecting piece part on a distal end side to press the side surface of a torque receiving part. The extension part is provided with a pressing operation part which is pressed to move the projecting piece part in a direction away from the side surface of the torque receiving part.

6 Claims, 12 Drawing Sheets

(58) Field of Classification Search
USPC .................................................... 188/73.38
See application file for complete search history.

(56) References Cited

U.S. PATENT DOCUMENTS

| | | | | |
|---|---|---|---|---|
| 7,318,503 | B2* | 1/2008 | Farooq | F16D 65/0974 188/205 A |
| 7,513,340 | B2* | 4/2009 | Hendrich | F16D 65/0972 188/73.36 |
| 9,528,564 | B2* | 12/2016 | Mallmann | F16D 55/226 |
| 10,041,553 | B2* | 8/2018 | Brizendine | F16D 65/0972 |
| 2007/0170019 | A1 | 7/2007 | Rockwell et al. | |
| 2007/0205061 | A1* | 9/2007 | Yagi | F16D 55/22 188/73.38 |
| 2010/0187050 | A1 | 7/2010 | Hayashi et al. | |
| 2010/0326777 | A1 | 12/2010 | Noguchi et al. | |
| 2013/0133990 | A1 | 5/2013 | Suzuki et al. | |
| 2015/0107944 | A1* | 4/2015 | Mallmann | F16D 65/0972 188/73.38 |
| 2015/0211589 | A1* | 7/2015 | Mallmann | F16D 65/0977 188/18 A |
| 2016/0131210 | A1* | 5/2016 | Brizendine | F16D 65/0978 188/73.38 |
| 2018/0038431 | A1* | 2/2018 | Gerber | F16D 55/2265 |

FOREIGN PATENT DOCUMENTS

| | | |
|---|---|---|
| JP | 2005-249133 A | 9/2005 |
| JP | 2015-505024 A | 2/2015 |
| JP | 5847561 B2 | 1/2016 |
| WO | 2013/119391 A1 | 8/2013 |

OTHER PUBLICATIONS

International Search Report of PCT/JP2017/010397 dated Jun. 20, 2017.
Indian Office Action received in corresponding Indian Application No. 201817030415 dated Apr. 30, 2020.
Japanese Office Action dated Jul. 28, 2020, received in corresponding Japanese Application No. 2019-142527.

* cited by examiner

DISC BRAKE

TECHNICAL FIELD

The present invention relates to a disc brake.

Priority is claimed on Japanese Patent Application No. 2016-127834, filed Jun. 28, 2016, the content of which is incorporated herein by reference.

BACKGROUND ART

There is a disc brake having a structure in which a first adjacent member and a second adjacent member of a brake pad clip applies a holding load to a part of an anchor plate (for example, refer to Patent Literature 1 below).

CITATION LIST

Patent Literature

Patent Literature 1

US Patent Application Publication No. 2007/0170019

SUMMARY OF INVENTION

Technical Problem

It is desirable to stably attach a pad spring to an attachment position of an attachment member.

The present invention provides a disc brake in which the pad spring can be stably attached to the attachment position of the attachment member.

Solution to Problem

In order to attain the above object, in the disc brake of the present invention, the pad spring has a guide part which is attached to be capable of coming into contact with an inner side surface and a bottom surface on an outer side in a disc radial direction of the pad guide and guides the friction pad in a disc axial direction, and an extension part which extends from the guide part in a direction away from the friction pad and comes into contact with a side surface of the torque receiving part of the attachment member through a projecting part on a distal end side to press the side surface of the torque receiving part. A pressing operation part which is pressed to move the projecting part in a direction away from the side surface of the torque receiving part is provided on the extension part.

Advantageous Effects of Invention

According to the aforementioned disc brake, the pad spring can be stably attached to the attachment position of the attachment member.

DESCRIPTION OF EMBODIMENTS

Hereinafter, an embodiment of the present invention will be described with reference to FIG. 1.

Figure 1:
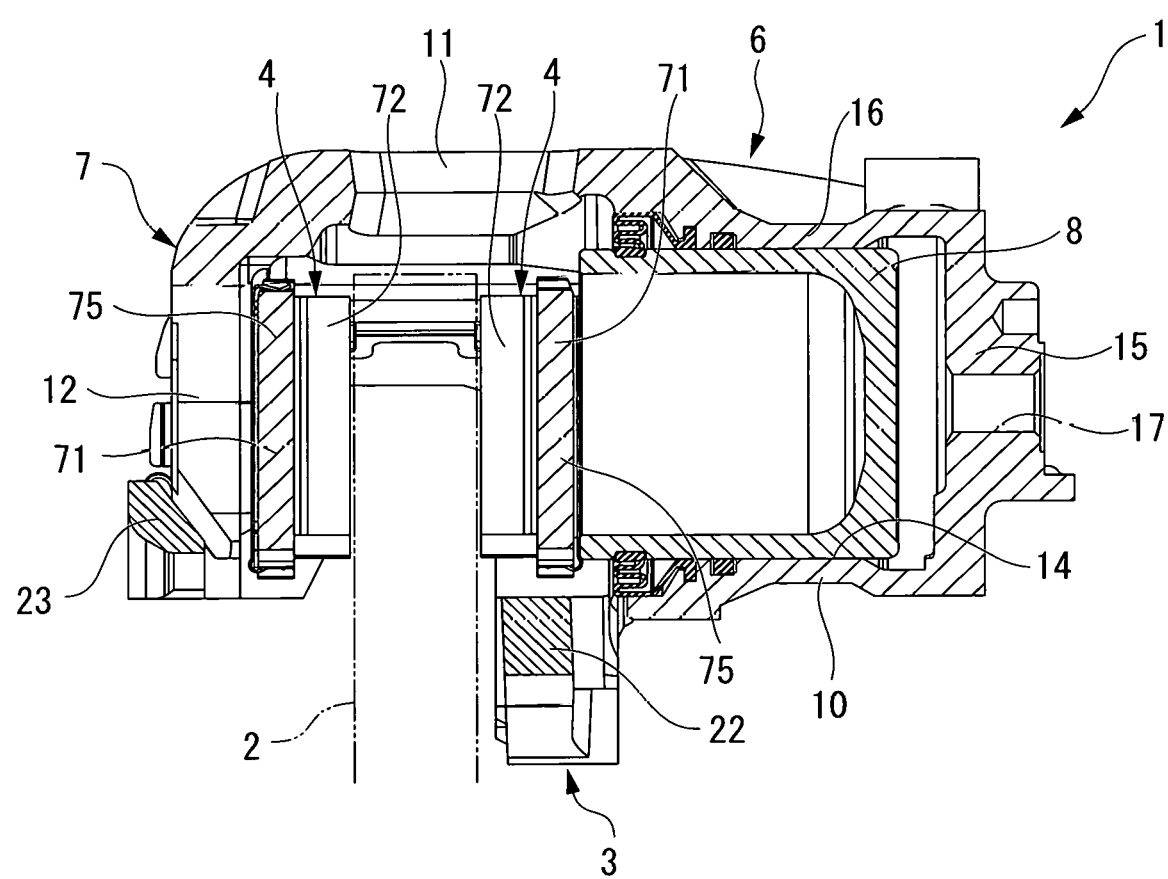
FIG. 1 is a cross-sectional view illustrating a disc brake according to an embodiment of the present invention.

FIG. 1 illustrates a disc brake 1. The disc brake 1 is for a vehicle such as an automobile. Specifically, the disc brake is for a four-wheeled vehicle. The disc brake 1 brakes the vehicle by stopping the rotation of a disc 2 rotating together with wheels (not illustrated). Hereinafter, a direction of a central axis of the disc 2 is referred to as a disc axial direction, a radial direction of the disc 2 is referred to as a disc radial direction, and a rotational direction of the disc is referred to as a disc rotational direction.

The disc brake 1 includes an attachment member 3, a pair of friction pads 4, and a caliper 6. The attachment member 3 is disposed across an outer peripheral side of the disc 2 and fixed to a non-rotating part of the vehicle. The pair of friction pads 4 are supported on the attachment member 3 to be movable in the disc axial direction, and are disposed to face each other on both sides of the disc 2. The caliper 6 is supported on the attachment member 3 to be slidable in the disc axial direction. The caliper 6 holds the pair of friction pads 4 and presses them against both sides of the disc 2.

The caliper 6 has a caliper body 7 and a piston 8. The caliper body 7 includes a cylinder 10, a bridge part 11 extending from the cylinder 10 to straddle the outer periphery of the disc 2, and a claw part 12 which extends from a side of the bridge part 11 opposite to the cylinder 10 and faces the cylinder 10.

The cylinder 10 is formed with a bore part 14 having one end opened toward the claw part 12. A piston 8 is accommodated in the bore part 14 to be movable in the disc axial direction. As the bore part 14 is formed, the cylinder 10 has a bottom part 15 on the side opposite to the claw part 12, and a tubular part 16 extending from the bottom part 15 toward the claw part 12 side in a tubular shape. A through hole 17 for introducing brake fluid into the bore part 14 is formed in the bottom part 15 of the cylinder 10.

When the brake fluid is introduced from the through hole 17 into the bore part 14 of the caliper body 7, the brake pressure acts on the piston 8. Then, the piston 8 advances toward the disc 2 side, and presses the friction pad 4 disposed between the piston 8 and the disc 2 toward the disc 2. As a result, the friction pad 4 moves to come into contact with the disc 2. Further, the reaction force of the pressing causes the caliper body 7 to move, and the claw part 12 presses the friction pad 4 disposed between the claw part 12 and the disc 2 toward the disc 2. As a result, the friction pad 4 comes into contact with the disc 2. In this way, by the operation of the piston 8, the caliper 6 clamps the pair of friction pads 4 from both sides by the piston 8 and the claw part 12 to press the pair of friction pads 4 against both sides of the disc 2. In other words, the pair of friction pads 4 are pressed against both sides of the disc 2 by the caliper 6. As a result, the caliper 6 gives frictional resistance to the disc 2 to generate a braking force.

Here, although not illustrated, two bore parts 14 arranged side by side in the disc rotational direction are provided in the cylinder 10. A piston 8 is provided in each of the bore parts 14. The brake fluid introduced into the through hole 17 is introduced into the bore parts 14 and advances the two pistons 8 toward the disc 2 side. That is, the caliper 6 is a two-pot floating caliper having two pistons 8.

Figure 2:
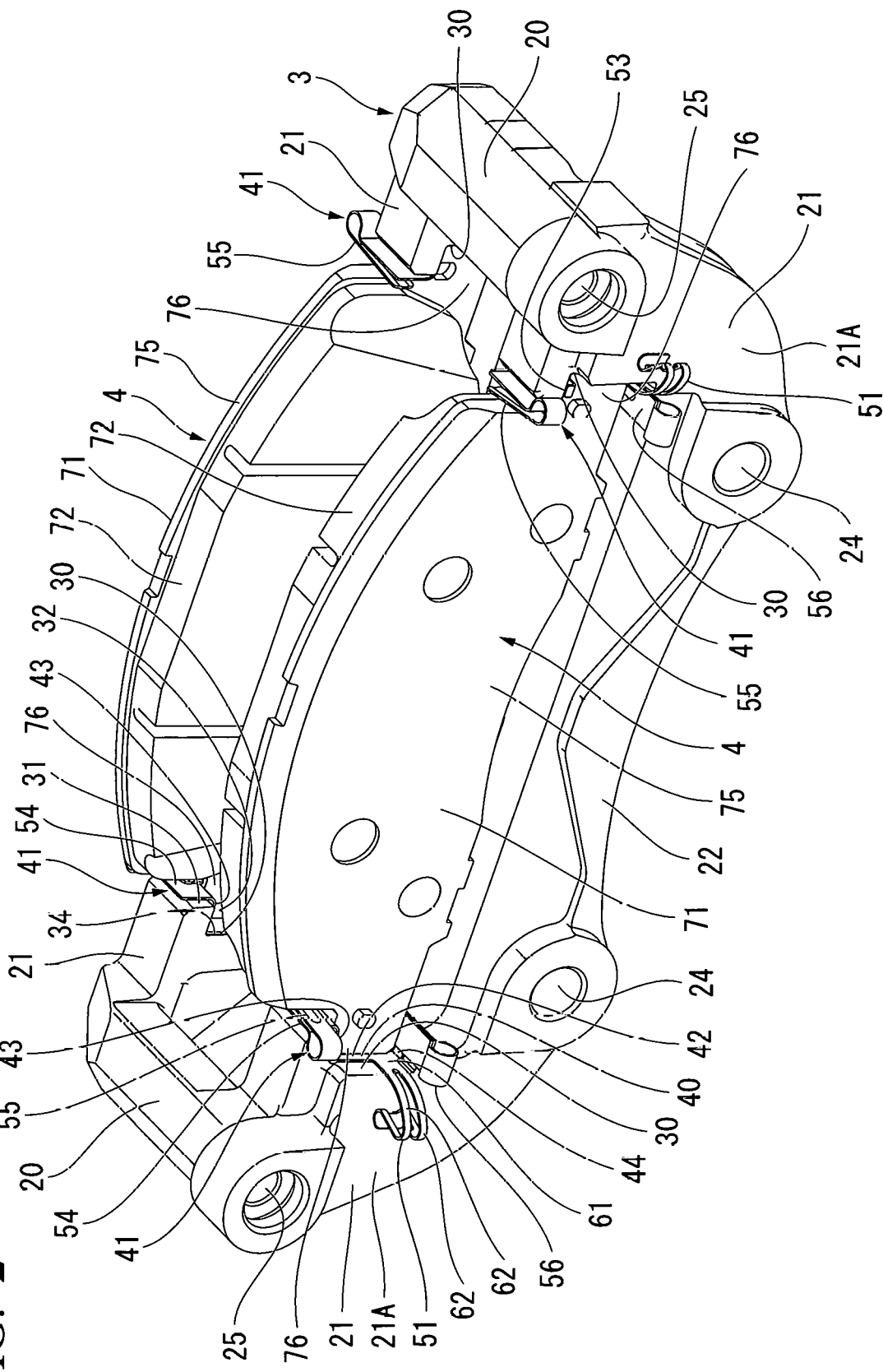
FIG. 2 is a perspective view of the disc brake according to the embodiment of the present invention excluding a caliper.

As illustrated in FIG. 2, the attachment member 3 is an integrally molded product having a mirror-symmetrical shape. The attachment member 3 has a pair of disc pass parts 20, four torque receiving parts 21, one attachment base 22, and one outer beam 23 illustrated in FIG. 1.

As illustrated in FIG. 2, the pair of disc pass parts 20 are separated from each other in parallel. The four torque receiving parts 21 extend in the same direction from both ends of each of the pair of disc pass parts 20 in the extending direction. The attachment base 22 connects the end portions of the two torque receiving parts 21 disposed on the same side in the extending direction of the pair of disc pass parts 20 on the side opposite to the pair of disc pass parts 20. The outer beam 23 connects the end portions of the remaining two torque receiving parts 21 on the side opposite to the pair of disc pass parts 20. A pair of attachment holes 24 are formed through the attachment base 22 at both end positions in the extending direction which is the side of each torque receiving part 21.

The attachment member 3 is attached to the non-rotating part of the vehicle by fastening members inserted through the pair of attachment holes 24. At that time, the pair of attachment holes 24 are arranged in the disc axial direction to be spaced from each other in the disc rotational direction. On the attachment member 3, support holes 25 are formed in each of the pair of disc pass parts 20 to be parallel to the attachment holes 24. The support holes 25 are formed from the end portion on the attachment base 22 side in the direction in which the attachment base 22 and the outer beam 23 are connected, to a middle position on the side of the outer beam 23. The pair of support holes 25 are parts into which a pin (not illustrated) of the caliper 6 illustrated in FIG. 1 is slidably fitted.

In a state in which the attachment member 3 illustrated in FIG. 2 is attached to the non-rotating part of the vehicle as described above, the pair of disc pass parts 20 extend in the disc axial direction, straddle the outer circumferential side of the disc 2 in the disc axial direction, and are disposed to be spaced apart from each other in the disc rotational direction. Further, in a state in which the attachment member 3 is attached to the non-rotating part of the vehicle, the two torque receiving parts 21 disposed on the same side in the disc axial direction with respect to the pair of disc pass parts 20 are disposed on one side of the disc 2 in the disc axial direction, and extend inward in the disc radial direction from the pair of disc pass parts 20. The two torque receiving parts 21 disposed on the opposite side in the disc axial direction with respect to the pair of disc pass parts 20 are disposed on the opposite side of the disc 2 in the disc axial direction, and extend inward in the disc radial direction from the pair of disc pass parts 20.

In a state in which the attachment member 3 is attached to the non-rotating part of the vehicle, the attachment base 22 extends in the disc rotational direction at the inner end position in the disc radial direction of the two torque receiving parts 21 disposed on one side of the disc 2 in the disc axial direction, and connects the two torque receiving parts 21. The outer beam 23 extends in the disc rotational direction at the inner end position in the disc radial direction of the two torque receiving parts 21 disposed on the opposite side of the disc 2 in the disc axial direction, and connects the two torque receiving parts 21. Therefore, the attachment base 22 and the outer beam 23 are disposed on both sides in the axial direction with respect to the disc 2. Here, the attachment base 22 is disposed on the inner side in the vehicle width direction of the vehicle (hereinafter referred to as an inner side) compared to the disc 2, and the outer beam 23 is disposed on the outer side in the vehicle width direction of the vehicle (hereinafter referred to as an outer side) compared to the disc 2.

A recessed pad guide 30 is formed in each of the four torque receiving parts 21.

Figure 3:
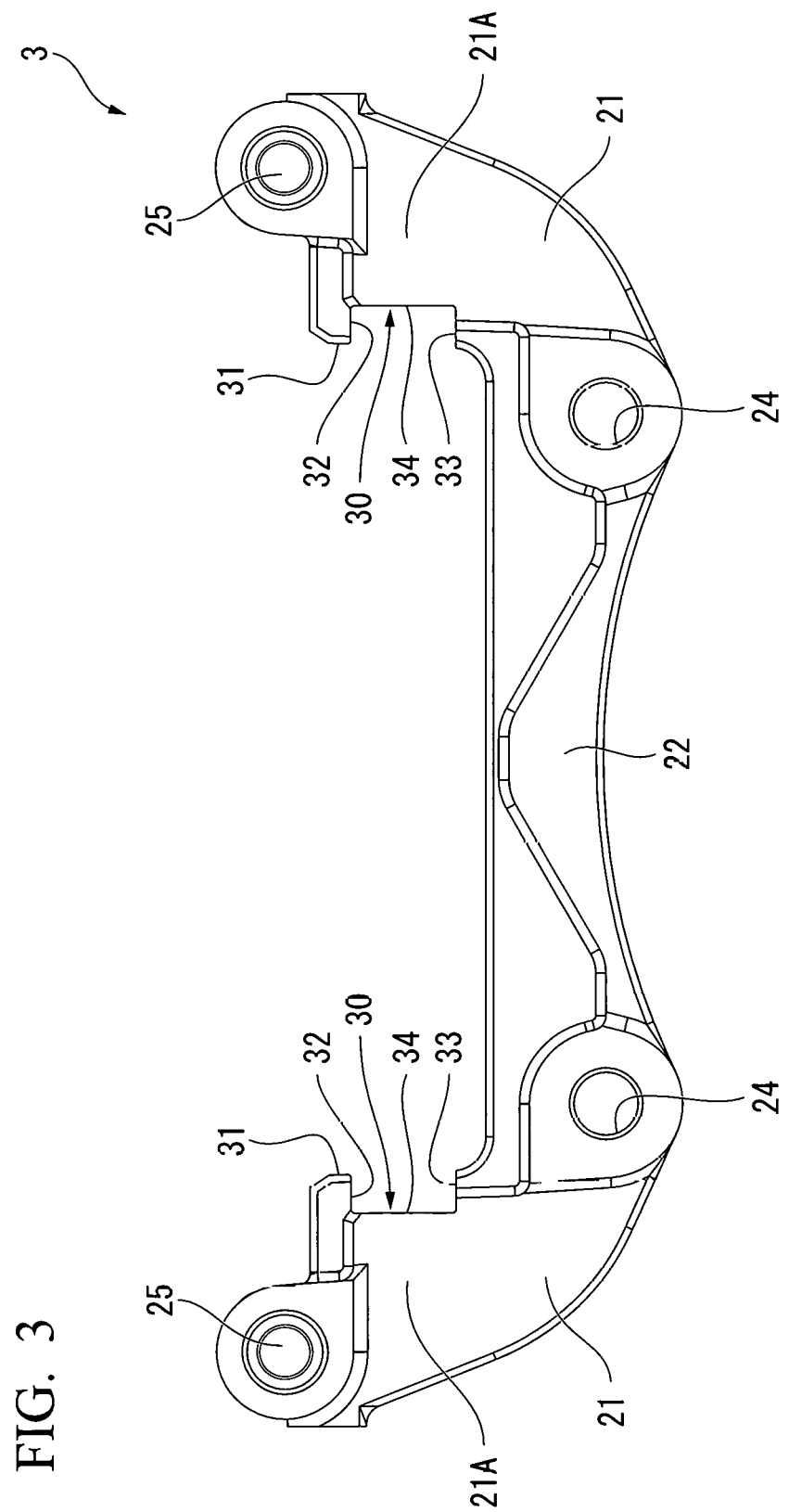
FIG. 3 is a front view illustrating an attachment member of the disc brake according to the embodiment of the present invention.

As illustrated in FIG. 3, the pad guide 30 is recessed from a distal end surface 31 on the side of the other torque receiving part 21 in which the position of the torque receiving part 21 in the disc axial direction matches and separates in the disc rotational direction away from the other torque receiving part 21. In other words, the pad guide 30 is recessed in the disc rotational direction. The pad guide 30 has an inner side surface 32 on the outer side in the disc radial direction, an inner side surface 33 on the inner side in the disc radial direction, and a bottom surface 34 for connecting them. All of the inner side surface 32, the inner side surface 33, and the bottom surface 34 extend in the disc axial direction. The inner side surface 32 and the inner side surface 33 extend in parallel with each other in the disc rotational direction from the distal end surface 31. The bottom surface 34 is orthogonal to the inner side surface 32 and the inner side surface 33, connects the side opposite to the distal end surface 31, and extends in the disc radial direction.

Each of the four torque receiving parts 21 illustrated in FIG. 2 has substantially the same structure. Recessed pad guides 30 recessed away from each other in the disc rotational direction are formed on the mutually opposite sides of the two torque receiving parts 21 disposed on the inner side with respect to the disc 2. Recessed pad guides 30 recessed away from each other in the disc rotational direction are formed on the mutually opposite sides of the two torque receiving parts 71 disposed on the outer side with respect to the disc 2.

Figure 4:
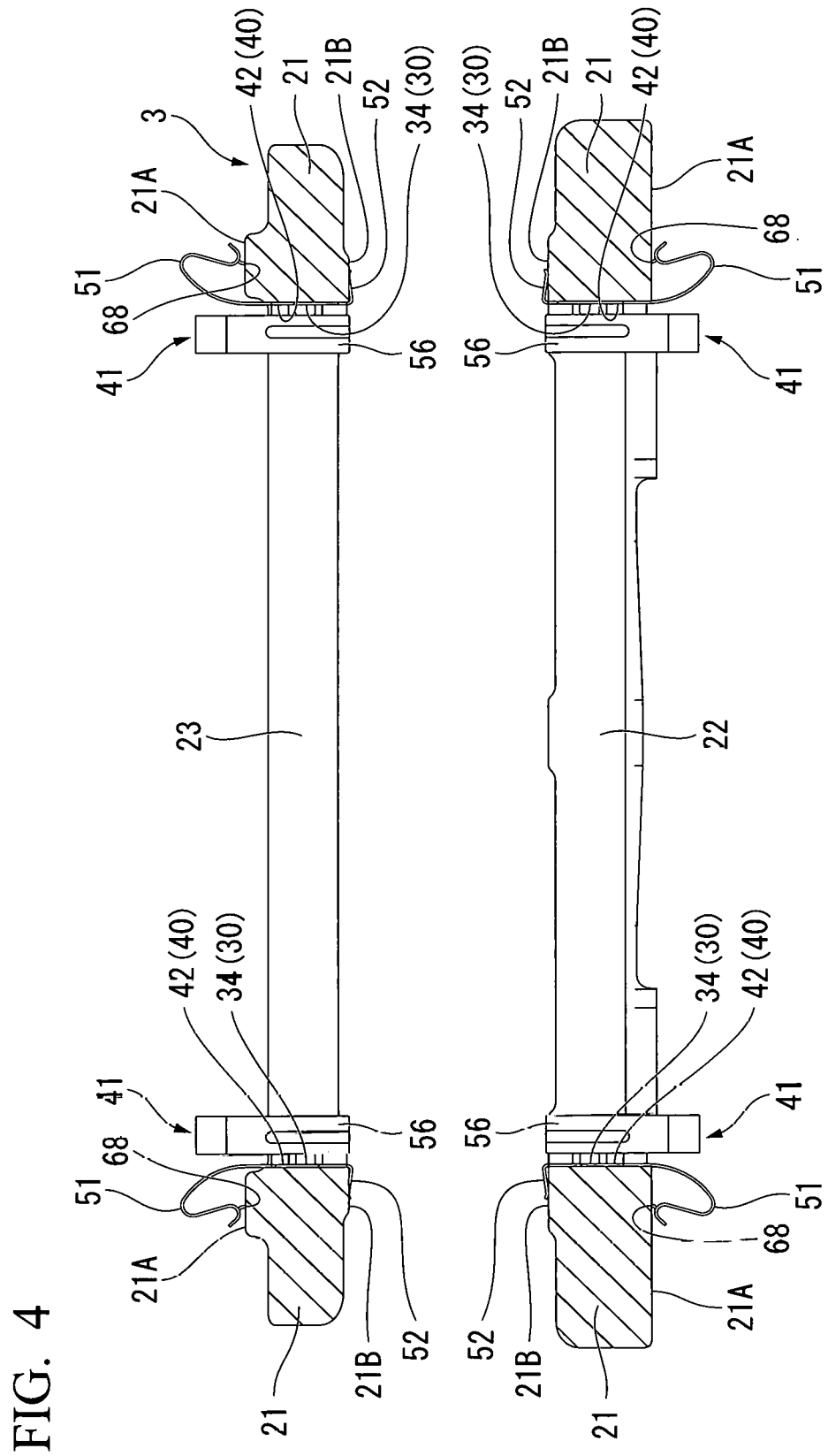
FIG. 4 is a cross-sectional view illustrating the attachment member and a pad spring of the disc brake according to the embodiment of the present invention.

As illustrated in FIGS. 2 and 4, a pad spring 41 is individually attached to each of the four torque receiving parts 21 on the attachment member 3. That is, four pad springs 41 equal in number to the torque receiving parts 21 are attached to one attachment member 3. The pad spring 41 disposed on one side in the disc rotational direction of the inner side, and the pad spring 41 disposed on the other side in the disc rotational direction of the outer side are common components. The pad spring 41 disposed on the other side in the disc rotational direction of the inner side, and the pad spring 41 disposed on one side in the disc rotational direction of the outer side are common components. The pad spring 41 on one side in the disc rotational direction of the inner side and on the other side in the disc rotational direction of the outer side, and the pad spring 41 on the other side in the disc rotational direction of the inner side and on one side in the disc rotational direction of the outer side have a mirror-symmetrical shape.

The pad spring 41 is formed by press molding from a single sheet material. An example of the pad spring 41 having a mirror-symmetrical shape will be described with reference to FIGS. 5 to 8.

Figure 5:
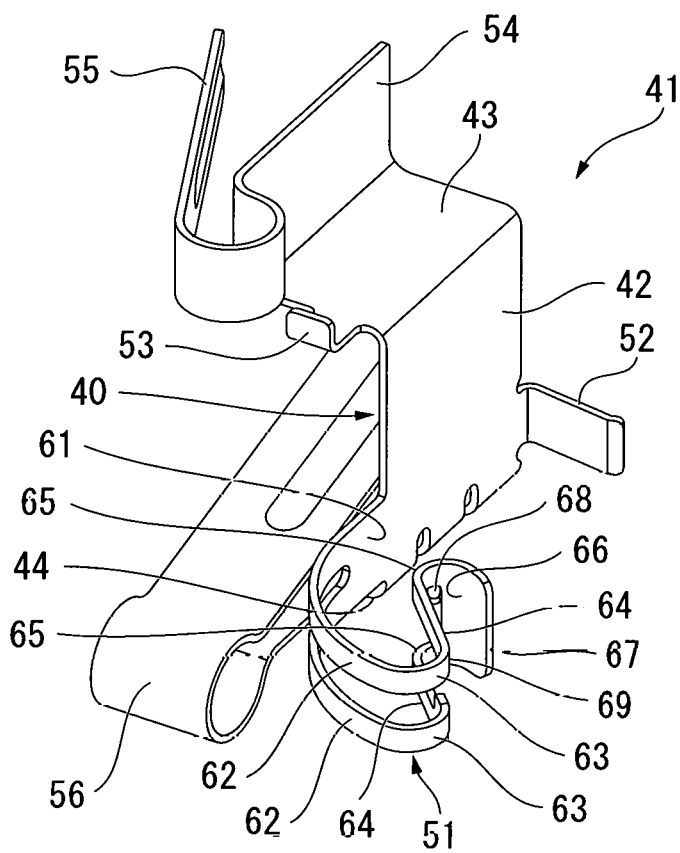
FIG. 5 is a perspective view illustrating the pad spring of the disc brake according to the embodiment of the present invention.
Figure 7:
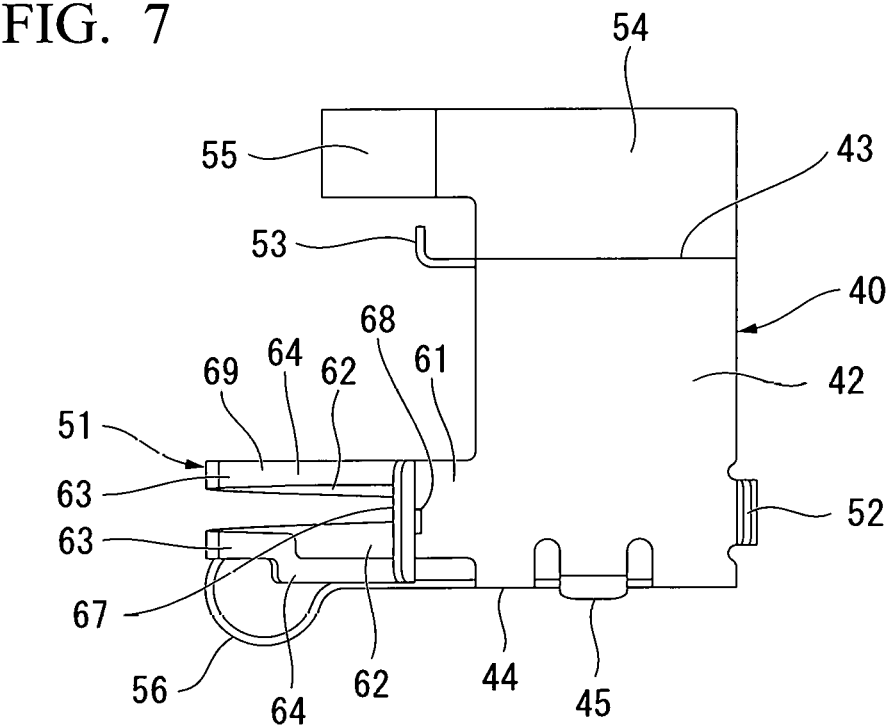
FIG. 7 is a front view illustrating the pad spring of the disc brake according to the embodiment of the present invention.
Figure 8:
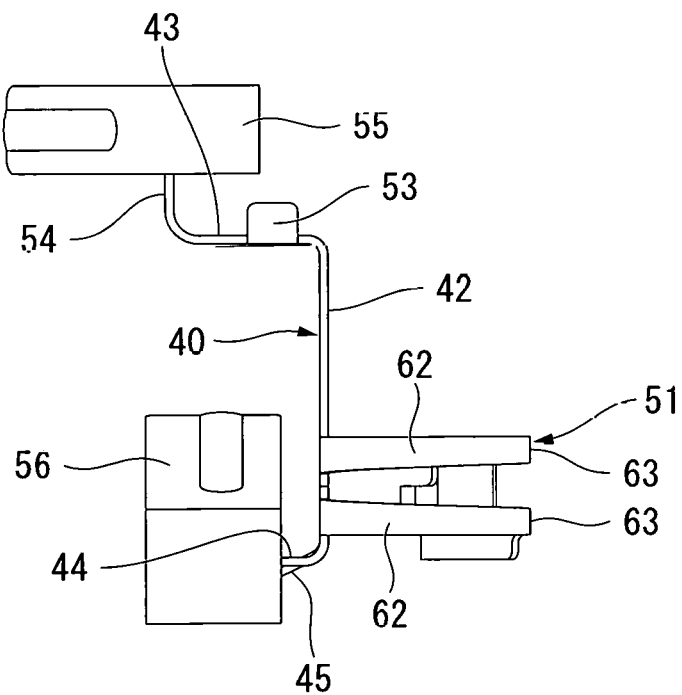
FIG. 8 is a side view illustrating the pad spring of the disc brake according to the embodiment of the present invention.

The pad spring 41 has a recessed guide part 40 as illustrated in FIGS. 5 and 8. As illustrated in FIG. 8, the guide part 40 has a board part 42, a plate part 43, a plate part 44, and a spring plate part 45. As illustrated in FIGS. 5 and 7, the board part 42 has a rectangular shape. As illustrated in FIG. 8, the plate part 43 extends perpendicularly to the board part 42 from one end edge portion of the board part 42. The plate part 44 extends in parallel to the plate part 43 from the other end edge portion parallel to one end edge portion of the board part 42 on the same side as the plate part 43. The spring plate part 45 is formed continuously from the plate part 44 side of the board part 42 as illustrated in FIG. 7 to the board part 42 side of the plate part 44 as illustrated in FIG. 8. The spring plate part 45 projects from the plate part 44 to a side opposite to the plate part 43.

As illustrated in FIG. 5, the pad spring 41 has an extension part 51, a projecting plate part 52, a projecting plate part 53, a projecting plate part 54, a spring plate part 55, and a spring plate part 56.

The extension part 51 has an S shape. The extension part 51 extends from a position near the plate part 44 of one end edge portion among the end edge portions in which the plate parts 43 and 44 of the board part 42 are not provided in the direction opposite to the plate parts 43 and 44 in the plate thickness direction of the board part 42. The projecting plate part 52 extends from a position near the plate part 44 of the other end edge portion among the end edge portions in which the plate parts 43 and 44 of the board part 42 are not provided in the direction opposite to the plate parts 43 and 44 in the plate thickness direction of the board part 42. The projecting plate part 53 projects from the end edge portion of the plate part 43 continuing to the end edge portion in which the extension part 51 of the board part 42 is provided in the same plane as the plate part 43, and then projects in the direction opposite to the plate part 44.

The projecting plate part 54 projects from an end edge portion of the plate part 43 on the side opposite to the board part 42 to be parallel to the board part 42 in a direction opposite to the plate part 44. The spring plate part 55 is folded back from the end edge portion of the projecting plate part 54 continuing to the end edge portion, in which the projecting plate part 53 of the plate part 43 is provided, to the side opposite to the plate part 43. The spring plate part 56 extends in the same plane as the plate part 44 from the end edge portion of the plate part 44 continuing to the end edge portion in which the extension part 51 of the board part 42 is provided, and then is folded back toward the plate part 43 side. The spring plate part 56, the board part 42, the plate part 43 and the plate part 44 constitute the recessed guide part 40 together.

The extension part 51 has a proximal end flat plate part 61, a pair of proximal end side curved plate parts 62, a pair of intermediate curved plate parts 63, a pair of intermediate flat plate parts 64, a pair of distal end side curved plate parts 65, a distal end side connection plate part 66, a distal end flat plate part 67, and a projecting piece part 68.

The proximal end flat plate part 61 has a flat plate shape, is located on the side of the extension part 51 closest to the board part 42, and extends from the board part 42 in a direction opposite to the projecting plate part 52 on the same plane as the board part 42.

The pair of proximal end side curved plate parts 62 extend from the end edge portion of the proximal end flat plate part 61 on the side opposite to the board part 42, while being spaced apart from each other in the direction connecting the plate parts 43 and 44. The pair of proximal end side curved plate parts 62 are similarly curved. The proximal end side curved plate parts 62 separate from the projecting plate part 52 as they separate from the proximal end flat plate part 61, and extend away from the board part 42 in the plate thickness direction as they separate from the proximal end flat plate part 61.

The pair of intermediate curved plate parts 63 are similarly curved. The intermediate curved plate parts 63 are curved to be folded back from the end portions of the pair of proximal end side curved plate parts 62 on the side opposite to the proximal end flat plate part 61 to the projecting plate part 52 side and the board part 42 side. The radius of curvature of the intermediate curved plate parts 63 is smaller than the radius of curvature of the proximal end side curved plate part 62.

Figure 6:
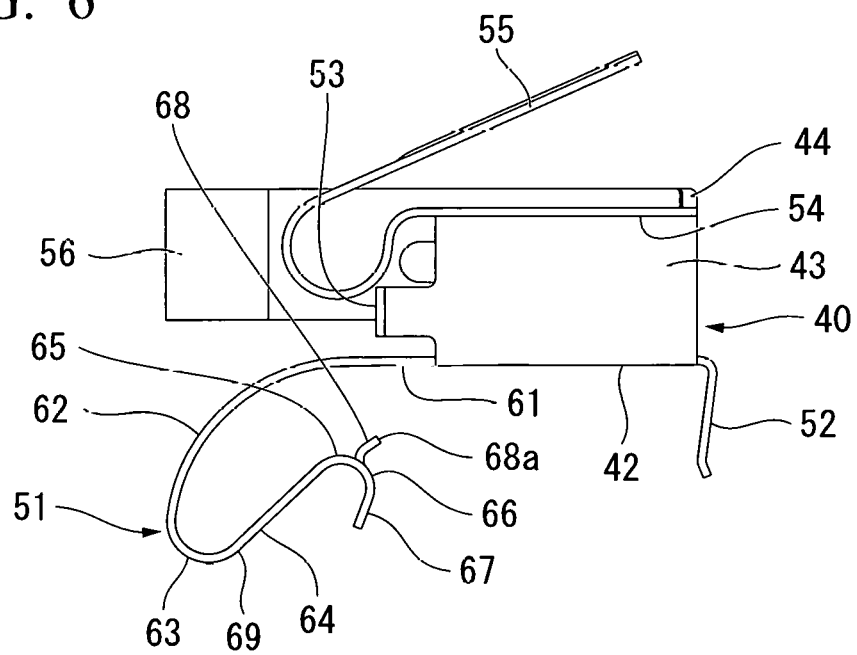
FIG. 6 is a plan view illustrating the pad spring of the disc brake according to the embodiment of the present invention.

The pair of intermediate flat plate parts 64 have flat plate shapes. The intermediate flat plate parts 64 extend from end portions of the pair of intermediate curved plate parts 63 on the side opposite to the pair of proximal end side curved plate parts 62 toward the board part 42. As illustrated in FIG. 6, the length of the intermediate flat plate parts 64 is shorter than the length in which both end portions of the proximal end side curved plate parts 62 are connected.

As illustrated in FIG. 5, the pair of distal end side curved plate parts 65 are similarly curved. The distal end side curved plate parts 65 are curved to be folded back from the end portions of the pair of intermediate flat plate parts 64 on the side opposite to the pair of intermediate curved plate parts 63 to the side opposite to the board part 42. The radius of curvature of the distal end side curved plate parts 65 is smaller than the radius of curvature of the intermediate curved plate part 63.

The distal end side connection plate part 66 connects the end portions of the pair of distal end side curved plate parts 65 on the side opposite to the pair of intermediate flat plate parts 64. The distal end side connection plate part 66 has the same radius of curvature as the pair of distal end side curved plate parts 65, and is curved to continue to the pair of distal end side curved plate parts 65.

The distal end flat plate part 67 has a flat plate shape. The distal end flat plate part 67 extends from an end edge portion of the distal end side connection plate part 66 on the side opposite to the pair of distal end side curved plate parts 65 toward the side opposite to the board part 42.

The projecting piece part 68 projects from the position between the pair of distal end side curved plate parts 65 of the end edge portion on the pair of distal end side curved plate parts 65 side of the distal end side connection plate part 66, toward the board part 42 of the guide part 40 as illustrated in FIG. 6. The projecting piece part 68 is provided on the distal end side of the extension part 51. The distal end portion 68a is located on the side closer to the projecting plate part 52 than any of the pair of distal end side curved plate parts 65, the distal end side connection plate part 66 and the distal end flat plate part 67 similarly provided on the distal end side of the extension part 51.

In the extension part 51, when a pressing operation part 69 near the boundary between the pair of intermediate curved plate parts 63 and the pair of intermediate flat plate parts 64 is pressed toward the pair of proximal end side curved plate parts 62 side from the side opposite to the pair of proximal end side curved plate parts 62, the pair of proximal end side curved plate parts 62 is elastically deformed mainly to increase the radius of curvature. At that time, the distal end portion 68a of the projecting piece part 68 moves in a direction away from the projecting plate part 52, and moves in a direction away from the board part 42 in the plate thickness direction of the board part 42.

Figure 9:
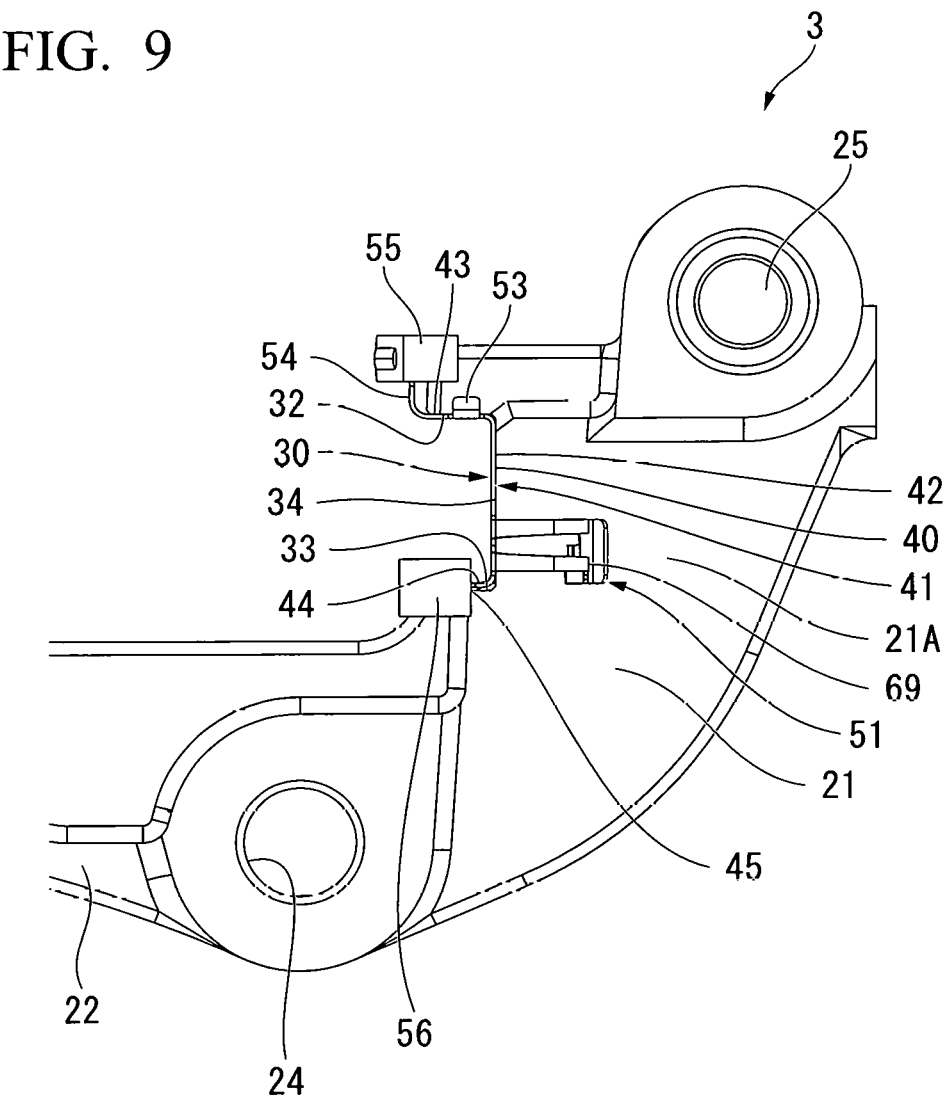
FIG. 9 is a partial front view illustrating the attachment member and the pad spring of the disc brake according to the embodiment of the present invention.
Figure 10:
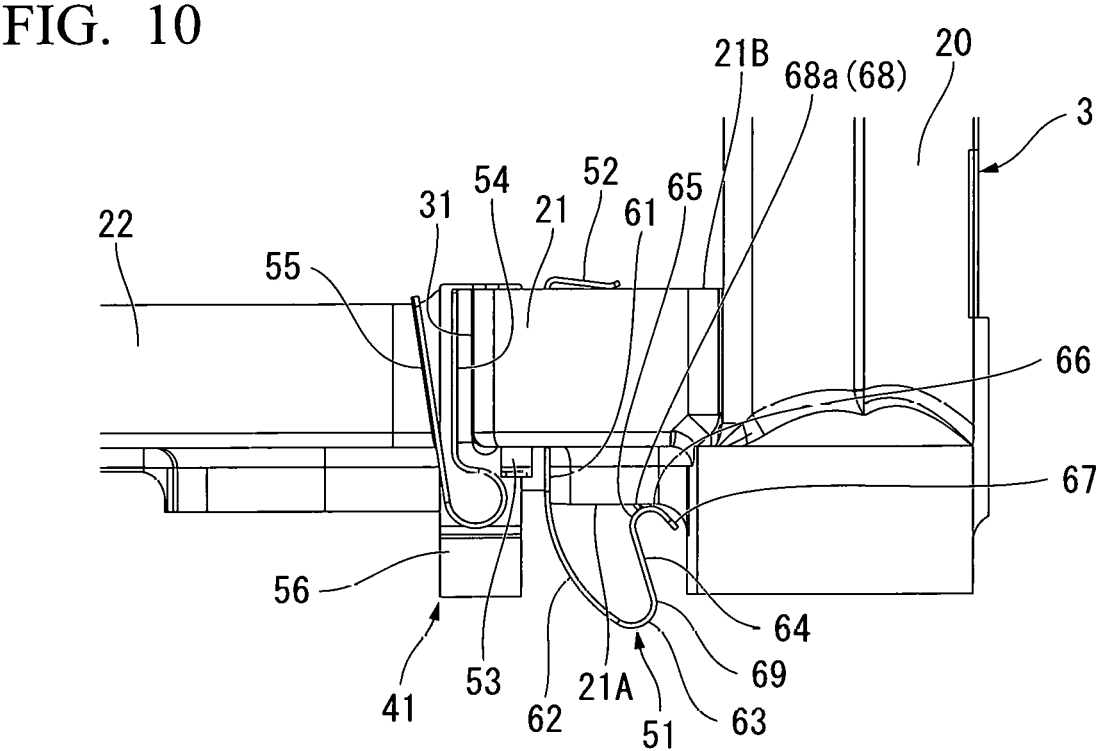
FIG. 10 is a partial plan view illustrating the attachment member and the pad spring of the disc brake according to the embodiment of the present invention.
Figure 11:
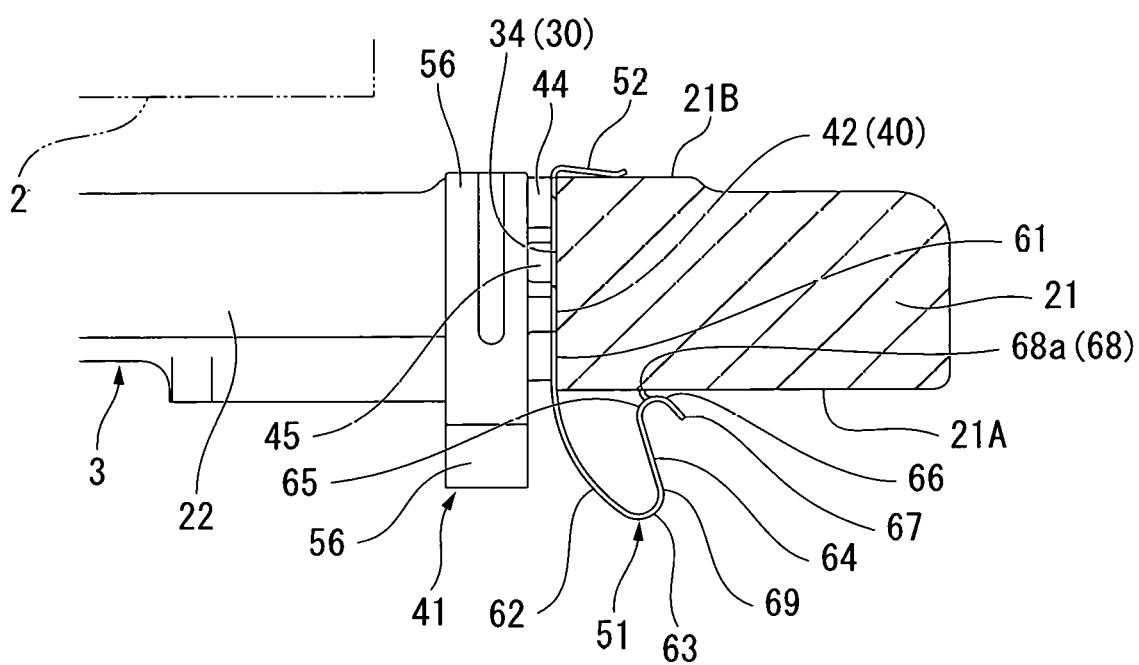
FIG. 11 is a partial cross-sectional view illustrating the attachment member and the pad spring of the disc brake according to the embodiment of the present invention.

When assembling the pad spring 41 to the attachment member 3 as illustrated in FIGS. 9 to 11, the operator holds the guide part 40 of the pad spring 41 illustrated in FIG. 5 with one hand, for example, and presses the pressing operation part 69 with the other hand from the side opposite to the pair of proximal end side curved plate parts 62 toward the pair of proximal end side curved plate parts 62 side. In the state in which the pressing operation part 69 is pressed in this way and the distance between the distal end portion 68a of the projecting piece part 68 illustrated in FIG. 6 and the projecting plate part 52 is enlarged, the pad spring 41 is attached to the torque receiving part 21 of the attachment member 3 illustrated in FIG. 11. At that time, in a posture in which the extension part 51 faces the side surface 21A of the casting skin opposite to the disc 2 of the torque receiving part 21, and the projecting plate part 52 faces the side surface 21B of the casting skin on the disc 2 side of the torque receiving part 21, the guide part 40 is fitted to the recessed pad guide 30 of the torque receiving part 21.

By being fitted to the pad guide 30 in this way, as illustrated in FIG. 9, the guide part 40 is inserted until the plate part 43 can be brought into contact with the inner side surface 32 on the outer side in the disc radial direction of the pad guide 30, the board part 42 can be brought into contact with the bottom surface 34 of the pad guide 30, and the board part 42 comes into contact with the bottom surface 34 of the pad guide 30. Further, by being fitted to the pad guide 30, the spring plate part 45 of the guide part 40 comes into contact with the inner side surface 33 on the inner side in the disc radial direction of the pad guide 30, and by the spring force of the spring plate part 45, the plate part 43 is brought into contact with the inner side surface 32 on the outer side in the disc radial direction of the pad guide 30.

When the board part 42 comes into contact with the bottom surface 34 of the pad guide 30 as described above, the operator releases the pressing of the pressing operation part 69. As a result, as illustrated in FIGS. 10 and 11, the extension part 51 returns from the elastic deformation, the distal end portion 68a of the projecting piece part 68 comes into contact with the side surface 21A of the casting skin of the torque receiving part 21, and the projecting plate part 52 comes into contact with the side surface 21B of the casting skin of the torque receiving part 21 to sandwich the torque receiving part 21 from both sides in the disc axial direction. At this time, since the distal end portion 68a of the projecting piece part 68 approaches the guide part 40, while approaching the side surface 21A of the torque receiving part 21, the board part 42 of the guide part 40 is pressed against the bottom surface 34 of the pad guide 30.

The pair of friction pads 4 illustrated in FIG. 2 are a common component. Each of the pair of friction pads 4 has a back plate 71, and a lining 72 adhering to the back plate 71. The friction pad 4 is supported on the attachment member 3 via the pad spring 41 on the back plate 71 and comes into contact with the disc 2 at the lining 72.

The back plate 71 has a main plate part 75 to which the lining 72 adheres, and a pair of projecting parts 76 projecting in opposite directions along the width direction from both end portions in the width direction of the main plate part 75. In one friction pad 4, a pair of projecting parts 76 are inserted into the guide parts 40 of the pair of pad springs 41 on one side which is the same side with respect to the disc 2. At that time, each of the pair of projecting parts 76 is clamped between the plate part 43 and the spring plate part 56 in a state in which the spring plate part 56 is elastically deformed, and the main plate part 75 elastically deforms the spring plate part 55. In the other friction pad 4, the pair of projecting parts 76 are inserted into the guide parts 40 of the pair of pad springs 41 on the other side which is the same side with respect to the disc 2. At that time, each of the pair of projecting parts 76 is clamped between the plate part 43 and the spring plate part 56 in a state in which the spring plate part 56 is elastically deformed, and the main plate part 75 elastically deforms the spring plate part 55.

Therefore, each pad spring 41 is attached to the attachment member 3 to elastically support the friction pad 4. The projecting part 76 is guided by the plate part 43, the board part 42 and the spring plate part 56 of the guide part 40 of the pad spring 41 and moves in the disc axial direction. In other words, the guide part 40 of the pad spring 41 guides the friction pad 4 in the disc axial direction. The projecting part 76 is pressed outward in the disc radial direction by the biasing force of the spring plate part 56 and comes into contact with the plate part 43. When the friction pad 4 receives a force inward in the disc radial direction, it slightly moves inward in the disc radial direction, while elastically deforming the spring plate part 56. The friction pad 4 is pressed by the biasing force of the spring plate part 55 in a direction in which the projecting part 76 separates from the board part 42. When the friction pad 4 receives a force in the disc rotational direction in the opposite direction, the friction pad 4 moves in the disc rotational direction, while elastically deforming the spring plate part 55, and brings the projecting part 76 into contact with the board part 42.

Figure 12:
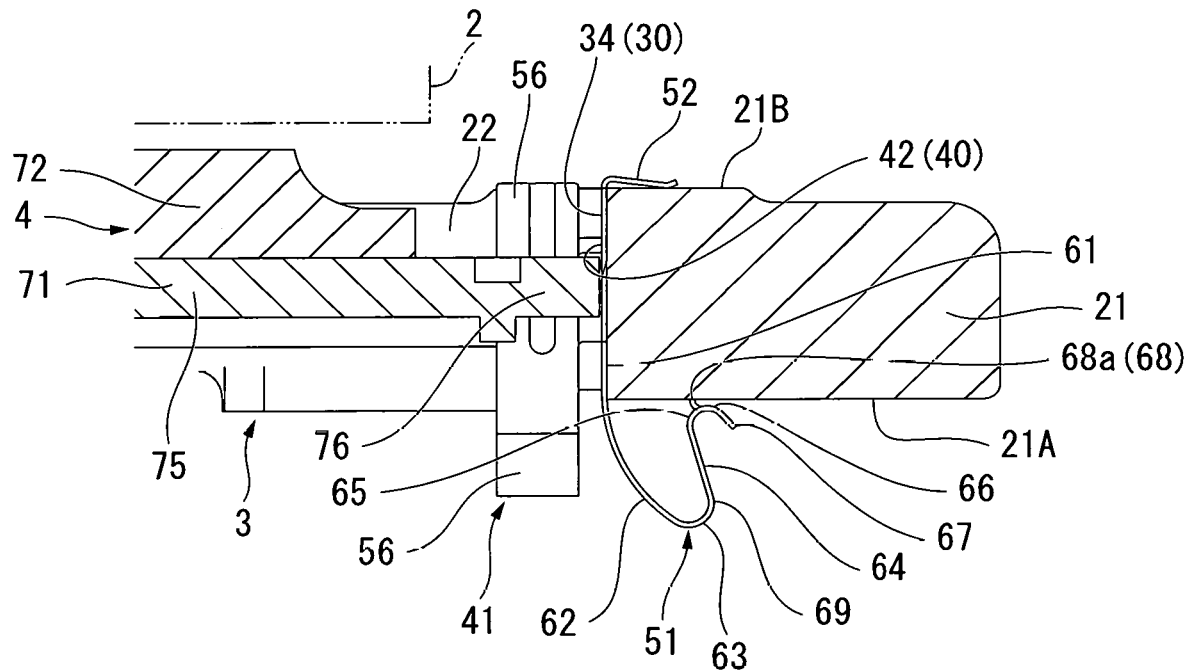
FIG. 12 is a partial cross-sectional view illustrating the attachment member, the pad spring and a friction pad of the disc brake according to the embodiment of the present invention.

In a state in which the four pad springs 41 are attached to the attachment member 3 and a pair of friction pads 4 are further attached via the pad springs 41, as illustrated in FIG. 12, the extension part 51 of the pad spring 41 separates from the friction pad 4 in the disc rotational direction from the end edge portion of the board part 42 of the guide part 40 on the side opposite to the disc 2, and extends in the direction away from the disc 2 in the disc axial direction. As illustrated in FIG. 2, the extension part 51 extends from art inner position in the disc radial direction of the guide part 40.

As illustrated in FIG. 12, the projecting plate part 52 projects in the direction opposite to the friction pad 4 in the disc rotational direction from the end edge portion of the board part 42 on the disc 2 side. The projecting plate part 53 illustrated in FIG. 2 projects from the end edge portion of the plate part 43 on the side opposite to the disc 2 toward the side opposite to the disc 2, and then projects outward in the disc radial direction. The projecting plate part 54 projects outward in the disc radial direction from the plate part 43. The spring plate part 55 is folded back from the side of the projecting plate part 54 opposite to the disc 2 toward the friction pad 4 side in the disc rotational direction. The spring plate part 56 is folded back from the side of the plate part 44 opposite to the disc 2 toward the outer side in the disc radial direction.

As illustrated in FIG. 12, the proximal end flat plate part 61 of the extension part 51 extends from the end edge portion of the board part 42 on the side opposite to the disc 2 toward the side opposite to the disc 2. As illustrated in FIG. 2, the pair of proximal end side curved plate parts 62 extend from the end edge portion of the proximal end flat plate part 61 on the side opposite to the disc 2 to be spaced apart from each other in the disc radial direction. As illustrated in FIG. 12, the pair of proximal end side curved plate parts 62 extend to be separated from the disc 2 in the disc axial direction as they are separated from the proximal end flat plate part 61, and extend to be separated from the friction pads 4 in the disc rotational direction as they are separated from the proximal end flat plate part 61.

The pair of intermediate curved plate parts 63 are curved so as to be folded back toward the disc 2 side in the disc axial direction, from the end portion of the pair of proximal end side curved plate parts 62 on the side opposite to the proximal end flat plate part 61. The pair of intermediate flat plate parts 64 is directed from the end portions of the pair of intermediate curved plate parts 63 on the side opposite to the pair of proximal end side curved plate parts 62 toward the disc 2 in the disc axial direction, and extends toward the friction pad 4 in the disc rotational direction.

The pair of distal end side curved plate parts 65 are curved so as to be folded back from the end portions of the pair of intermediate flat plate parts 64 on the side opposite to the pair of intermediate curved plate parts 63 toward the side opposite to the friction pad 4 in the disc rotational direction. The distal end flat plate part 67 extends from the end edge portion of the distal end side connection plate part 66 on the side opposite to the pair of distal end side curved plate part 65 toward the side opposite to the disc 2 in the disc axial direction, and toward the side opposite to the friction pad 4 in the disc rotational direction.

The projecting piece part 68 projects from the distal end side connection plate part 66 toward the disc 2 in the disc axial direction, and toward the friction pad 4 in the disc rotational direction. The projecting piece part 68 on the distal end side of the extension part 51 similarly protrudes toward the disc 2 in the disc axial direction from any one of the pair of distal end side curved plate parts 65, the distal end side connection plate part 66 and the distal end flat plate part 67 on the distal end side of the extension part 51, and comes into contact with the side surface 21A of the torque receiving part 21 opposite to the disc 2. The extension part 51 presses the side surface 21A toward the disc 2 side.

When the pressing operation part 69 is pressed toward the pair of proximal end side curved plate parts 62 from the side opposite to the pair of proximal end side curved plate parts 62 in the disc rotational direction, the extension part 51 is elastically deformed so that the pair of proximal end side curved plate parts 62 mainly increases the radius of curvature. At that time, depending on the shape of the extension part 51, the distal end portion 68a of the projecting piece part 68 moves in a direction away from the disc 2 in the disc axial direction, and moves in a direction away from the guide part 40 in the disc rotational direction. In other words, the pressing operation part 69 is provided in the extension part 51, and is pressed to move the projecting piece part 68 in a direction away from the side surface 21A of the torque receiving part 21. The pressing operation part 69 is provided between the projecting piece part 68 of the extension part 51 and the guide part 40.

In the caliper 6 illustrated in FIG. 1, pins (not illustrated) attached to both sides of the caliper body 7 in the disc rotational direction are slidably fitted to a pair of support holes 25 of the attachment member 3 illustrated in FIG. 2. Thus, the caliper 6 is provided on the attachment member 3 so as to be slidable in the disc axial direction. At that time, as illustrated in FIG. 1, the caliper 6 disposes the cylinder 10 of the caliper body 7 and the piston 8 on the side of the friction pad 4 of the inner side opposite to the disc 2, and disposes the claw part 12 on the side of the friction pad 4 of the outer side opposite to the disc 2, respectively In the disc brake described in the Japanese Patent Application (Published Japanese Translation No. 2009-524786 of the PCT International Publication) corresponding to the US application of Patent Document 1, the brake pad clip has the base part, the first adjacent member, and the second adjacent member. A holding load is applied to the anchor plate by clamping the anchor plate between the first adjacent member and the second adjacent member. Here, the first adjacent member has a shape that extends from the base part in a direction opposite to the second adjacent member and then folds back. Therefore, when the anchor plate is pushed between the first adjacent member and the second adjacent member, since the first adjacent member is pushed by the anchor plate and is elastically deformed toward the base part, even when the anchor plate is pressed against the base part, thereafter, when releasing the pressing force, a gap may be formed between the base part and the anchor plate due to the return of the elastic deformation of the first adjacent member. When such a gap exists, there is a high possibility that a so-called slight pressure sound is generated, in which the restraining force of the friction pad due to the anchor plate is weakened, and a brake noise is generated at the time of a light brake operation.

In contrast, in the disc brake 1 according to the present embodiment, the pad spring 41 has the guide part 40 which is attached to be capable of coming into contact with the inner side surface 32 and the bottom surface 34 on the outer side in the disc radial direction of the pad guide 30 to guide the friction pad 4 in the disc axial direction, and the extension part 51 which extends from the guide part 40 in a direction away from the friction pad 4 and comes into contact with the side surface 21A of the torque receiving part 21 of the attachment member 3 by the projecting piece part 68 on the distal end side to press the side surface 21A of the torque receiving part 21. A pressing operation part 69 which is pressed to move the projecting piece part 68 in a direction away from the side surface 21A of the torque receiving part 21 is provided on the extension part 51.

As a result, when attaching the pad spring 41 to the attachment member 3, the pressing operation part 69 is pressed to move the projecting piece part 68 in a direction away from the side surface 21A of the torque receiving part 21, and after the guide part 40 is pressed against the bottom surface 34 of the pad guide 30, when the pressing of the pressing operation part 69 is released and the projecting piece part 68 is brought into contact with the side surface 21A of the torque receiving part 21, the extension part 51 can be suppressed from moving in a direction away from the guide part 40 after the contact. Therefore, it is possible to suppress an occurrence of a gap between the board part 42 of the guide part 40 and the bottom surface 34 of the pad guide 30, and the board part 42 and the bottom surface 34 can be easily brought into close contact with each other. That is, the pad spring 41 can be stably and easily attached to the attachment position of the attachment member 3, and the reliability of attachment can be improved. As a result, the restraint of the attachment member 3 through the pad spring 41 to the friction pad 4 is accelerated, and the slight pressure sound can be suppressed. Further, the workability of the manual mounting work can be improved, and the automatic assembling using the machine can be easily performed.

In particular, even if the side surface 21A of the torque receiving part 21 with which the extension part 51 of the pad spring 41 comes into contact is a casting skin, since it is possible to easily bring the board part 42 and the bottom surface 34 into close contact with each other, the side surface 21A is not necessarily to be processed, and the cost can be reduced.

Moreover, when the pressing operation part 69 is pressed, the distal end portion 68a of the projecting piece part 68 moves in a direction away from the guide part 40 in the disc rotational direction. Therefore, when the pressing of the pressing operation part 69 is released, the distal end portion 68a of the projecting piece part 68 moves to approach the guide part 40. Therefore, after the extension part 51 comes into contact with the side surface 21A of the torque receiving part 21, a force of pulling the guide part 40 is generated, and the board part 42 and the bottom surface 34 can be brought into close contact with each other.

Further, since the pressing operation part 69 which is pressed is provided between the projecting piece part 68 of the extension part 51 and the guide part 40, the pressing operation is easily performed. Therefore, the workability of the attaching work can be improved.

Further, since the extension part 51 extends from the inner position of the guide part 40 in the disc radial direction, collapse of the pad spring 41 can be suppressed.

The extension part 51 of the pad spring 41 comes into contact with the side surface 21A of the torque receiving part 21 of the attachment member 3 with the projecting piece part 68 on the distal end side to press the side surface 21A. The extension part 51 may be variously modified without being limited to the aforementioned shape, as long as there is a pressing operation part which is pressed to move the projecting piece part 68 in a direction away from the side surface 21A.

Figure 13:
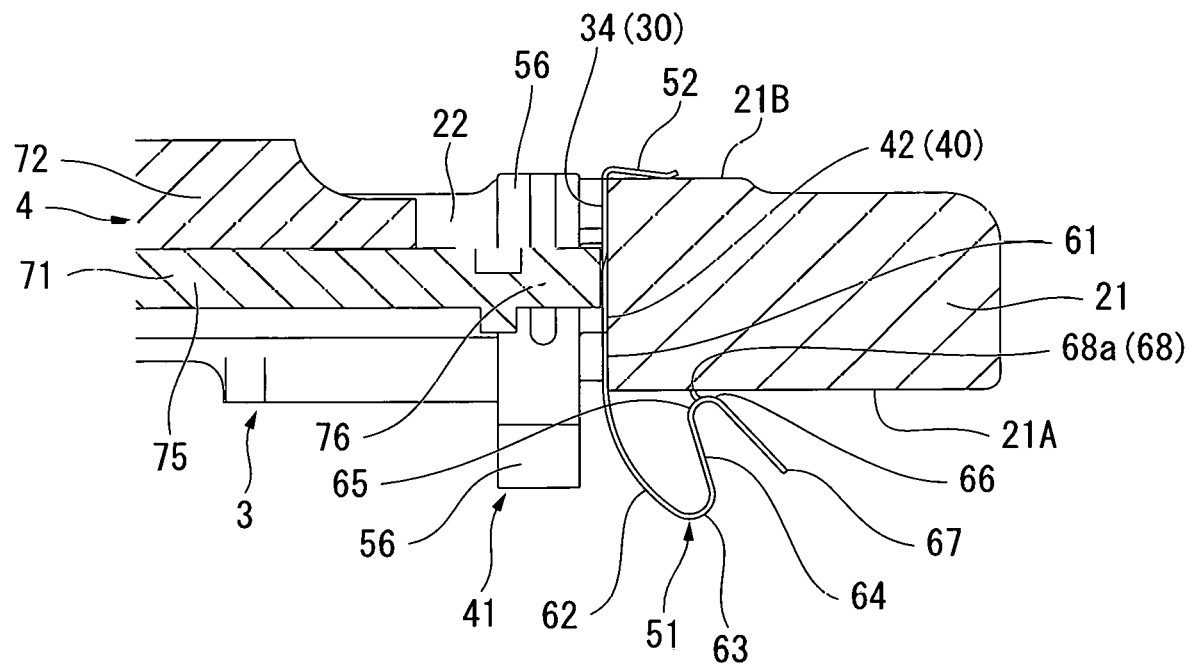
FIG. 13 is a partial cross-sectional view illustrating the attachment member of the disc brake according to the embodiment of the present invention and a pad spring of a first modified example.

For example, as in a first modified example illustrated in FIG. 13, the distal end flat plate part 67 extends toward the distal end side as compared with above, and the distal end flat plate part 67 is used as a pressing operation part. As a result, the extended distal end flat plate part 67 serving as the pressing operation part is provided on the side opposite to the guide part 40 of the projecting piece part 68 of the extension part 51. Even in this case, the pressing operation is easy to perform, and the workability of the attaching work can be improved.

Figure 14:
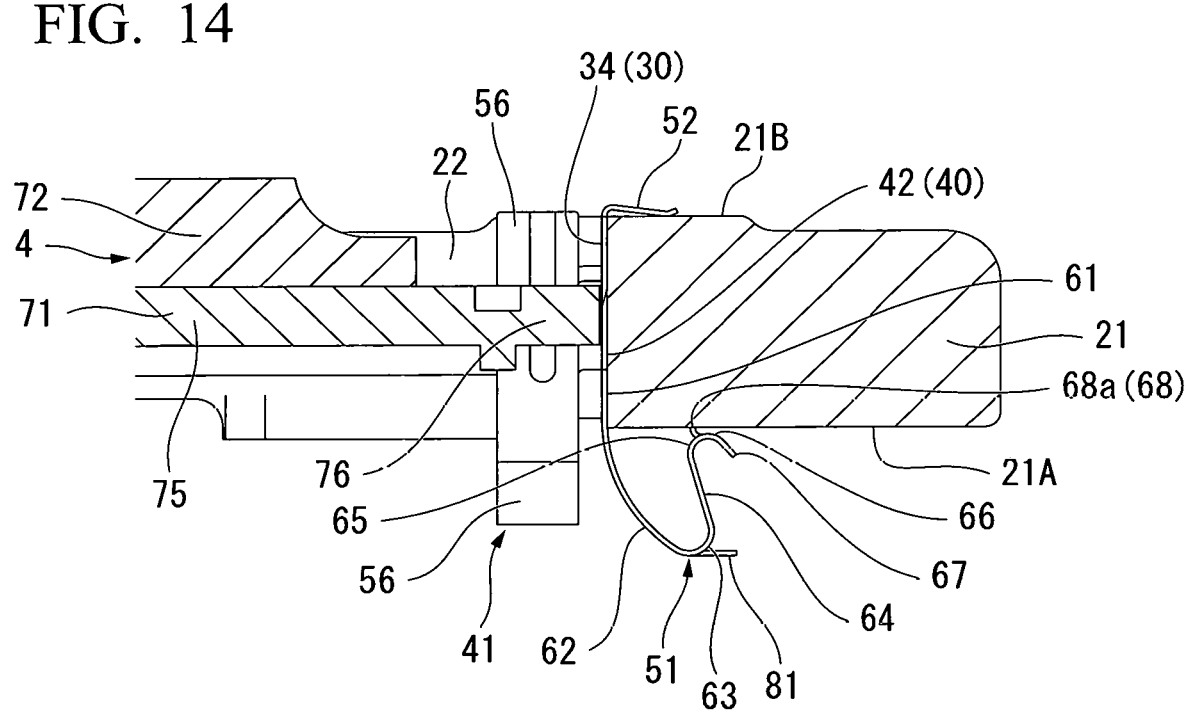
FIG. 14 is a partial cross-sectional view illustrating the attachment member of the disc brake according to the embodiment of the present invention and a pad spring of a second modified example.
Figure 15:
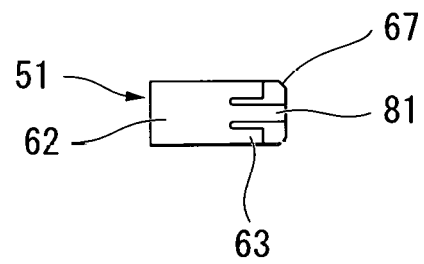
FIG. 15 is a front view illustrating an extension part of the pad spring according to the second modified example of the disc brake according to the embodiment of the present invention.

As in a second modified example illustrated in FIGS. 14 and 15, the proximal end side curved plate part 62 is set as one, the proximal end side curved plate part 62 side of the intermediate curved plate part 63 is set as one, the side opposite to the proximal end side curved plate part 62 of the intermediate curved plate part 63 is set as a pair, and the pressing operation part 81 is made to protrude from between the pair of intermediate curved plate parts 63. As a result, the pressing operation part 81 is formed to protrude partially from the extension part 51. Also in this case, the pressing operation is easy to perform, and the workability of the attaching work can be improved.

Figure 16:
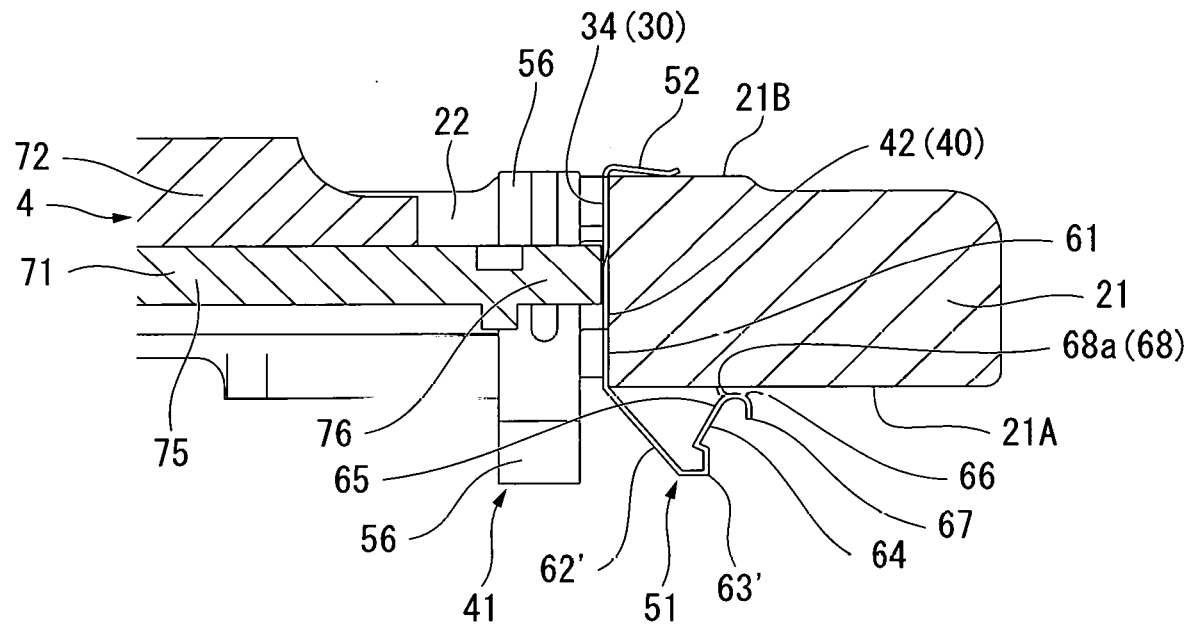
FIG. 16 is a partial cross-sectional view illustrating the attachment member of the disc brake according to the embodiment of the present invention and a pad spring of a third modified example.

As in a third modified example illustrated in FIG. 16, a flat proximal end side flat plate part 62' is provided instead of the pair of proximal end side curved plate parts 62, and a bent intermediate folded plate part 63' is provided instead of the pair of intermediate curved plate parts 63, and the pair of intermediate flat plate parts 64 extends in a direction away from the board part 42 in the plate thickness direction of the board part 42. In this case, the intermediate bent plate part 63' is used as a pressing operation part.

Figure 17:
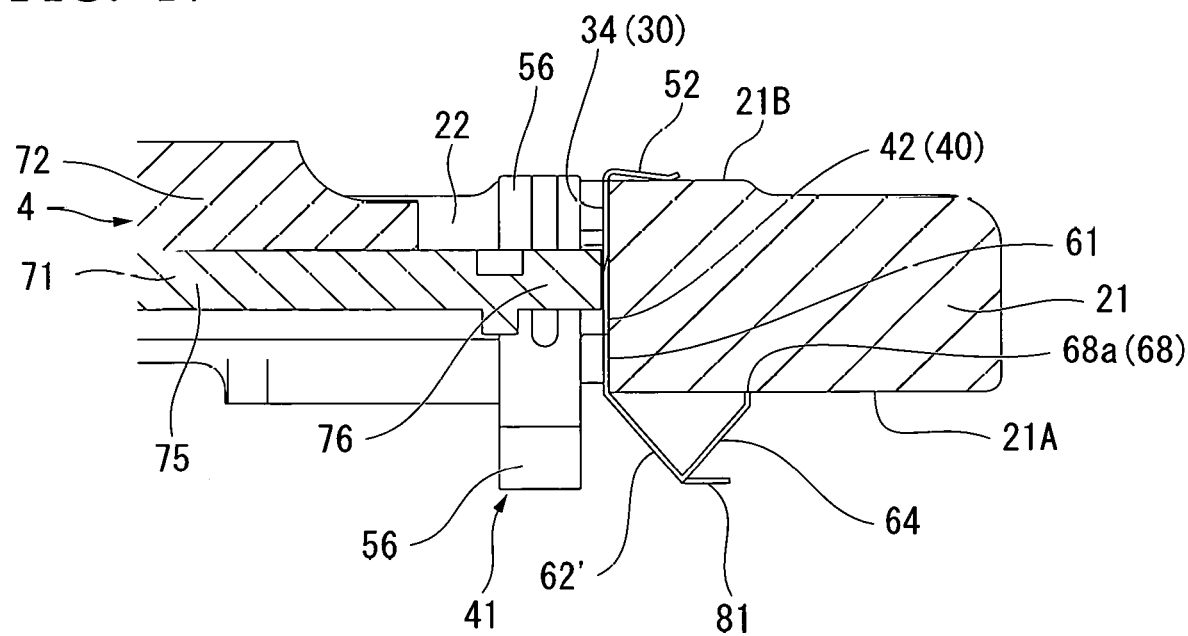
FIG. 17 is a partial cross-sectional view illustrating the attachment member of the disc brake according to the embodiment of the present invention and a pad spring of a fourth modified example.

As in a fourth modification illustrated in FIG. 17, a flat proximal end side flat plate part 62' is provided instead of the proximal end side curved plate part 62, the pair of intermediate curved plate parts 63 is eliminated, and the pair of intermediate flat plate parts 64 extends from the proximal end side flat plate part 62' in a direction away from the board part 42 in the plate thickness direction of the board part 42. A projecting piece part 68 is provided at the end portion of the pair of intermediate flat plate parts 64 on the side opposite to the proximal end side flat plate part 62'. In this case, the pressing operation part 81 is caused to protrude from the position between the pair of intermediate flat plate parts 64 of the proximal end side flat plate part 62'.

Figure 18:
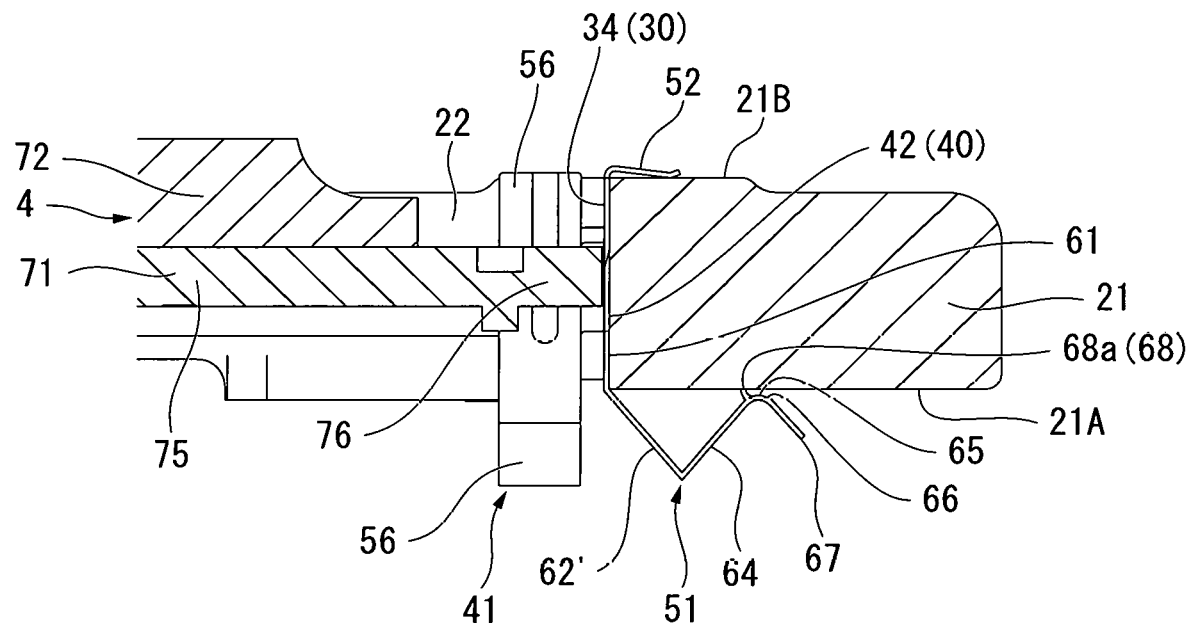
FIG. 18 is a partial cross-sectional view illustrating the attachment member of the disc brake according to the embodiment of the present invention and a pad spring of a fifth modified example.

As in a fifth modified example illustrated in FIG. 18, a flat proximal end side flat plate part 62' is provided instead of the pair of proximal end side curved plate parts 62, the pair of intermediate curved plate parts 63 are eliminated, and the pair of intermediate flat plate parts 64 extend in the direction away from the board part 42 in the plate thickness direction of the hoard part 42. A pair of distal end side curved plate parts 65, a distal end side connection plate part 66, a distal end flat plate part 67 and a projecting piece part 68 are provided on the side of the pair of intermediate flat plate parts 64 opposite to the proximal end side flat plate part 62', the flat plate part 67 is lengthened to serve as a pressing operation part.

According to the aforementioned embodiments, the disc brake according to the first aspect of the present invention includes an attachment member attached to a non-rotating part of a vehicle and having a recessed pad guide, a caliper slidably provided on the attachment member, a pair of friction pads having a projecting part inserted into the pad guide and pressed against both sides of the disc by the caliper, and a pad spring attached to the attachment member to elastically support the friction pads. The pad spring has a guide part which is attached to be capable of coming into contact with an inner side surface and a bottom surface on the outer side in the disc radial direction of the pad guide and guides the friction pad in the disc axial direction, and an extension part which extends from the guide part in a direction away from the friction pad and comes into contact with the side surface of the torque receiving part of the attachment member by the projecting piece part on the distal end side to press the side surface of the torque receiving part. The extension part is provided with a pressing operation part which is pressed to move the projecting piece part in a direction away from a side surface of the torque receiving part. Therefore, the pad spring can be stably attached to the attachment position of the attachment member.

According to a second aspect, in the first aspect, the pressing operation part is provided between the projecting piece part of the extension part and the guide part. Accordingly, the pressing operation is easily performed, and the workability of the attaching operation is improved.

According to a third aspect, in the first aspect, the pressing operation part is provided on a side opposite to the guide part compared to the projecting piece part of the extension part. This facilitates the pressing operation and improves the workability of the attaching operation.

According to a fourth aspect, in any one of the first to third aspects, the pressing operation part is formed to protrude partially from the extension part. This facilitates the pressing operation and improves the workability of the attaching operation.

INDUSTRIAL APPLICABILITY

According to the aforementioned disc brake described, the pad spring can be stably attached to the attachment position of the attachment member.

REFERENCE SIGNS LIST

1 Disc brake
2 Disc
3 Attachment member
4 Friction pad
6 Caliper
21 Torque receiving part
21A Side surface
30 Pad guide
32 Inner side surface
34 Bottom surface
40 Guide part
41 Pad spring
51 Extension part
68 Projecting piece part
69, 81 Pressing operation part
76 Projecting part

The invention claimed is:

1. A disc brake comprising:
an attachment member which is configured to be attached to a non-rotating part of a vehicle and has a recessed pad guide;
a caliper slidably provided on the attachment member;
a pair of friction pads which have projecting parts configured to be inserted into the pad guide, and are pressed against both sides of the disc by the caliper; and
a pad spring which is attached to the attachment member to elastically support the friction pads,
wherein the pad spring comprises:
a guide part which is attached to come into contact with an inner side surface and a bottom surface on an outer side in a disc radial direction of the pad guide, and guides the friction pad in a disc axial direction,
an extension part which extends from the guide part away from the friction pad,
an intermediate curved plate part provided on the extension part, the intermediate curved plate part being curved to be folded back to the friction pad in a thickness direction of the guide part,
a projecting piece part extending from the intermediate curved plate part, the projecting piece part coming into contact with a side surface of a torque receiving part of the attachment member to press the side surface of the torque receiving part, and
a pressing operation part which is pressed to move the projecting piece part away from the side surface of the torque receiving part.

2. The disc brake according to claim 1, wherein the pressing operation part is provided between the projecting piece part of the extension part and the guide part.

3. The disc brake according to claim 2, wherein the pressing operation part is formed to protrude partially from the extension part.

4. The disc brake according to claim 1, wherein the pressing operation part is provided on a side opposite to the guide part compared to the projecting piece part of the extension part.

5. The disc brake according to claim 4, wherein the pressing operation part is formed to protrude partially from the extension part.

6. The disc brake according to claim 1, wherein the pressing operation part is formed to protrude partially from the extension part.

* * * * *